United States Patent
Hassan

(10) Patent No.: US 10,033,483 B2
(45) Date of Patent: Jul. 24, 2018

(54) ADJUSTABLE INTERLEAVING FOR COMMUNICATION DATA

(71) Applicant: Microsoft Technology Licensing, LLC, Redmond, WA (US)

(72) Inventor: Amer Aref Hassan, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 117 days.

(21) Appl. No.: 14/715,417

(22) Filed: May 18, 2015

(65) Prior Publication Data

US 2016/0344514 A1 Nov. 24, 2016

(51) Int. Cl.
*H04L 1/00* (2006.01)
*H04W 36/00* (2009.01)

(52) U.S. Cl.
CPC .......... *H04L 1/0071* (2013.01); *H04L 1/0009* (2013.01); *H04L 1/0018* (2013.01); *H04L 1/0026* (2013.01); *H04W 36/0005* (2013.01)

(58) Field of Classification Search
CPC ... H04L 1/0071; H04L 1/0009; H04L 1/0018; H04L 1/0026; H04W 36/0005
See application file for complete search history.

(56) References Cited

U.S. PATENT DOCUMENTS

| | | |
|---|---|---|
| 5,699,365 A | 12/1997 | Klayman et al. |
| 6,167,060 A | 12/2000 | Vargo et al. |
| 6,310,909 B1 * | 10/2001 | Jones ............... H04L 5/0046 375/220 |
| 6,477,669 B1 | 11/2002 | Agarwal et al. |
| 6,671,851 B1 | 12/2003 | Moulsley |
| 6,772,388 B2 | 8/2004 | Cooper et al. |
| 7,861,132 B1 | 12/2010 | O'Donnell et al. |
| 8,204,140 B2 | 6/2012 | Hoffman et al. |
| RE43,836 E | 11/2012 | Morris et al. |
| 8,468,426 B2 | 6/2013 | Bims |
| 8,502,859 B2 | 8/2013 | Kamath et al. |
| 8,737,436 B2 | 5/2014 | Ohayon et al. |
| 8,855,145 B2 | 10/2014 | Vafin et al. |
| 2005/0138524 A1 | 6/2005 | Cioffi |
| 2006/0107170 A1 * | 5/2006 | Deczky ............. H03M 13/2742 714/752 |

(Continued)

FOREIGN PATENT DOCUMENTS

EP 1936855 A1 6/2008
WO WO-2004040831 5/2004

OTHER PUBLICATIONS

"International Search Report and Written Opinion Issued in PCT Application No. PCT/US2016/032806", dated Jul. 21, 2016, 12 Pages.

(Continued)

*Primary Examiner* — Chirag Shah
*Assistant Examiner* — Joshua Smith

(57) ABSTRACT

Techniques for adjustable interleaving for communication data are described. In at least some embodiments, interleaving depth for data is adjustable based on various parameters, such as a media type included in the data, signal quality for a signal used to transmit the data, and so forth. Thus, implementations discussed herein enable dynamic adjustment of interleaving and encoding for data to be transmitted as part of a communication session.

20 Claims, 9 Drawing Sheets

(56) References Cited

U.S. PATENT DOCUMENTS

| | | | |
|---|---|---|---|
| 2006/0107174 A1* | 5/2006 | Heise | H04L 1/004 |
| | | | 714/755 |
| 2007/0124626 A1* | 5/2007 | Lee | H04L 1/0009 |
| | | | 714/704 |
| 2007/0206635 A1* | 9/2007 | Pozhenko | H04L 47/10 |
| | | | 370/473 |
| 2008/0256418 A1 | 10/2008 | Luby et al. | |
| 2010/0332941 A1* | 12/2010 | Gilson | H04L 1/0001 |
| | | | 714/762 |
| 2011/0289379 A1 | 11/2011 | Uhlemann | |
| 2014/0282775 A1* | 9/2014 | Bhat | H04N 21/23614 |
| | | | 725/109 |
| 2016/0112756 A1* | 4/2016 | Winters | H04N 21/4383 |
| | | | 725/110 |
| 2016/0248474 A1* | 8/2016 | Gilson | H04B 3/06 |

OTHER PUBLICATIONS

"Second Written Opinion Issued in PCT Application No. PCT/US2016/032806", dated Apr. 6, 2017, 6 Pages.

"International Preliminary Report on Patentability Issued in PCT Application No. PCT/US2018/032806", dated Jul. 7, 2017, 12 Pages.

Dadfarnia, "New Interleaving and Forward Error Correction Strategies for Streaming", In Proceedings of first International Conference on Future Computer and Communication Retrieved From: <http://link.springer.com/chapter/10.1007/978-3-642-02342-2_11> Feb. 24, 2015, Jun. 6, 2009, 5 pages.

Zhai, "Rate-Distortion Optimized Product Code Forward Error Correction for Video Transmission over IP-Based Wireless Networks", In Proceedings of IEEE International Conference on Acoustics, Speech, and Signal Processing, vol. 5, May 17, 2004, 4 pages.

* cited by examiner

ADJUSTABLE INTERLEAVING FOR COMMUNICATION DATA

BACKGROUND

Modern communication systems have an array of capabilities, including integration of various communication modalities with different services. For example, voice/video communications, instant messaging, data/application sharing, white-boarding, and other forms of communication may be combined with presence and availability information for users. Such systems enable users to engage in communication sessions to exchange different types of communication media, such as voice data, video data, content sharing, and combinations thereof. Furthermore, collaboration systems that enable users to share and collaborate in creating and modifying various types of documents and content may be integrated with multimodal communication systems providing different kinds of communication and collaboration capabilities. Such integrated systems are sometimes referred to as Unified Communication (UC) systems.

While UC systems provide for increased flexibility in communications, they also present a number of implementation challenges. For instance, typical data encoding techniques used for wireless transmission of data are static and are not designed to account for the dynamic nature of UC data. Further, UC is typically implemented via software that can be loaded on mobile devices, e.g., tablets, smartphones, laptops, and so forth. Thus, techniques for managing UC communication traffic typically have to be fluid and dynamic to accommodate changing connection scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for adjustable interleaving for communication data are described. In at least some embodiments, interleaving depth for data is adjustable based on various parameters, such as a media type included in the data, signal quality for a signal used to transmit the data, and so forth. Thus, implementations discussed herein enable dynamic adjustment of interleaving and encoding for data to be transmitted as part of a communication session.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
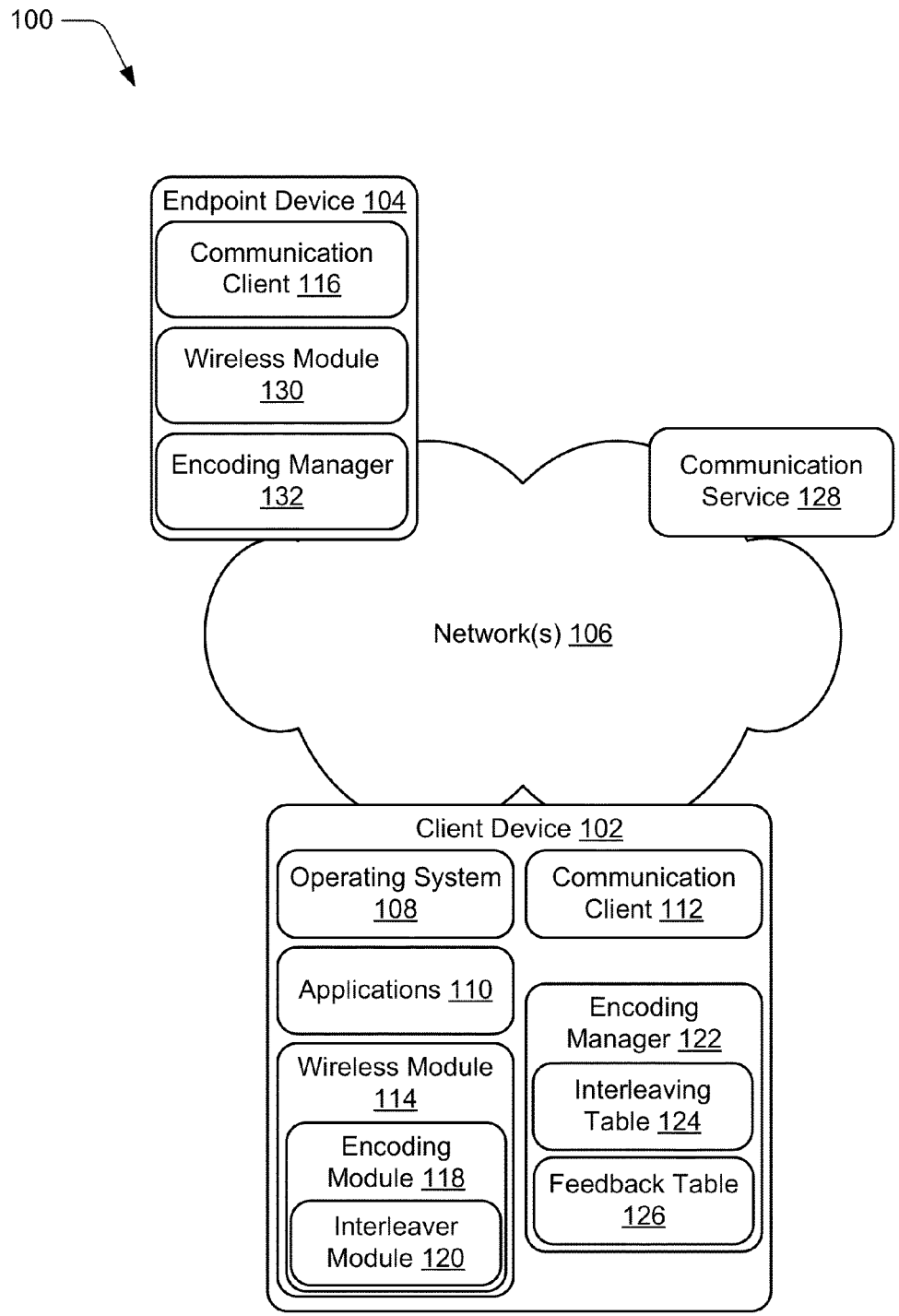
FIG. 1 is an illustration of an environment in an example implementation that is operable to employ techniques discussed herein.

Techniques for adjustable interleaving for communication data are described. According to various implementations, interleaving refers to different procedures for shuffling bits of a data stream that is to be transmitted, such as over a wired and/or wireless network. Generally, interleaving mitigates the effects of bursty errors that may be introduced into data that is transmitted wirelessly, such as errors caused by interference or multipath that affects a wireless signal.

In an example implementation, a client device is participating in a communication session with one or more other devices via a data connection to a wireless network. Generally, a communication session refers to an exchange of communication media between communication endpoints, such as part of a real-time communication session between users of different communication endpoints. Examples of a communication session include a Voice over Internet Protocol (VoIP) call, a video call, text messaging, a file transfer, and/or combinations thereof. A communication session, for instance, is typically implemented via Internet Protocol (IP). In at least some implementations, a communication session represents a Unified Communications (UC) session.

The client device processes data to be transmitted as part of the communication session in various ways. For instance, the client device applies error coding to the data, such as forward error correction (FEC). As part of the error coding, the data is interleaved using any suitable interleaving technique. Examples of different interleaving techniques include block interleaving, convolutional interleaving, random interleaving, and so forth. According to various implementations, a depth value used to interleave the data is selected based on a media type included in the communication session. For instance, different interleaving depths are specified for different media types.

In at least some implementations, an interleaver depth for a particular media type is selected based on a delay tolerance for the media type. For instance, voice data typically has a lower delay tolerance than file transfer data, and thus voice data may have a lower interleaver depth than file transfer data.

Accordingly, data of the communication session is interleaved using the selected interleaver depth to generate an interleaved data stream. The interleaved data stream is then transmitted wirelessly from a client device to an endpoint device involved in the communication session. The endpoint device decodes the interleaved data stream to extract data (e.g., media data) of the communication session. The endpoint device also inspects the data for errors and other attributes, and generates feedback for the data stream. The feedback, for instance, indicates a general quality of the data stream, and/or includes error statistics for the data stream. The endpoint device communicates the feedback to the client device. Based on the feedback, the client device may perform various actions, such as increasing the interleaver depth to mitigate errors caused by interference in wireless transmission, adjusting error coding rate for data of the communication session, and so forth.

In at least some implementations, an interleaving mode is adjusting based on a change in network connectivity, such as changes in radio channel characteristics for a radio channel being used to transmit data of a communication session. For instance, if network connectivity changes from one wireless network to a different wireless network during a communication session, an interleaving mode is adjusted to accommodate the different wireless network. For instance, an interleaving mode that is better suited to a wireless technology utilized by the different wireless network is selected. Thus, interleaving mode may be dynamically adjusted to accommodate changes in network connectivity.

Thus, implementations discussed herein enable dynamic adjustment of interleaving and encoding for data to be transmitted wirelessly as part of a communication session. Such dynamic adjustment optimizes session performance by increasing signal quality, decreasing and/or distributing signal errors, and so forth. Thus, user experience during a communication session is enhanced.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques adjustable interleaving for communication data described herein. Generally, the environment 100 includes various devices, services, and networks that enable communication via a variety of different modalities. For instance, the environment 100 includes a client device 102 and an endpoint device 104 connected to a network 106. The client device 102 and the endpoint device 104 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), and so forth.

The network 106 is representative of a network that provides the client device 102 and the endpoint device 104 with connectivity to various networks and/or services, such as the Internet. The network 106, for instance, enables data to be transmitted wirelessly between the client device 102 and the endpoint device 104. The network 106 may be implemented via a variety of different connectivity technologies, such as broadband cable, digital subscriber line (DSL), wireless cellular, wireless data connectivity (e.g., WiFi™), T-carrier (e.g., T1), Ethernet, and so forth. In at least some implementations, the network 106 represents different interconnected wired and wireless networks.

The client device 102 includes a variety of different functionalities that enable various activities and tasks to be performed. For instance, the client device 102 includes an operating system 108, applications 110, a communication client 112, and a wireless module 114. Generally, the operating system 108 is representative of functionality for abstracting various system components of the client device 102, such as hardware, kernel-level modules and services, and so forth. The operating system 108, for instance, can abstract various components of the client device 102 to the applications 110 to enable interaction between the components and the applications 110.

The applications 110 represent functionalities for performing different tasks via the client device 102. Examples of the applications 110 include a word processing application, a spreadsheet application, a web browser, a gaming application, and so forth. The applications 110 may be installed locally on the client device 102 to be executed via a local runtime environment, and/or may represent portals to remote functionality, such as cloud-based services, web apps, and so forth. Thus, the applications 110 may take a variety of forms, such as locally-executed code, portals to remotely hosted services, and so forth.

The communication client 112 is representative of functionality to enable different forms of communication via the client device 102, such as for communication between the client device 102 and the endpoint device 104. Examples of the communication client 112 include a voice communication application (e.g., a VoIP client), a UC client, a video communication application, a messaging application, a content sharing application, and combinations thereof. The communication client 112, for instance, enables different communication modalities to be combined to provide diverse communication scenarios. In at least some implementations, the communication client 112 represents an application that is installed on the client device 102. Additionally or alternatively, the communication client 112 can be implemented as a portal to a remote application, such as accessed via a web browser, a web application, and so forth.

According to one or more implementations, communication between the client device 102 and the endpoint device 104 occurs between the communication client 112 and a communication client 116 of the endpoint device 104. The communication client 116, for instance, represents an instance of the communication client 112. For example, a communication session between the client device 102 and the endpoint device 104 represents an exchange of communication media between the communication client 112 and the communication client 116. In at least some implementations, the communication clients 112, 116 represents applications that execute at an application layer of their respective devices.

The wireless module 114 of the client device 102 is representative of functionality for enabling the client device 102 to communicate data wirelessly over the network 106. For instance, the wireless module 114 represents hardware and logic for data communication over the network 106 via a variety of different wireless technologies and protocols.

The wireless module 114 includes an encoding module 118, which is representative of functionality to perform various encoding and decoding tasks for the client device 102. The encoding module 118, for example, is representative of functionality to perform various error correction coding, such as forward error correction (FEC). For instance, data that is to be wirelessly transmitted by the client device 102 is encoded by the encoding module 118 prior to transmission. Further, encoded data that is received by the client device 102 via a wireless signal is decoded by the encoding module 118 to reveal decoded data. The encoding module 118 includes an interleaver module 120, which is representative of functionality to perform interleaving of different types of data. For instance, the interleaver module 120 can interleave a data stream by shuffling bits of the data stream prior to the data stream being transmitted. Interleaving, for instance, is performed as part of FEC applied to a data stream. Further details concerning the encoding module 118 and the interleaver module 120 are discussed below.

The wireless module 114 includes other components not expressly illustrated herein, such as an encryption module for encrypting and decrypting data, a radio frequency (RF) modulator for modulating and demodulating data, RF components (e.g., antennas, radios, and so forth) for transmitting and receiving RF signal, and so forth.

The client device 102 further includes an encoding manager module 122, which is representative of functionality to manage various aspects of encoding performed by the encoding module 118. For instance, the encoding manager 122 enables dynamic adjustment of correction encoding applied by the encoding module, such as in response to media type being transmitted, in response to changes in signal quality, and so forth. In at least some implementations, the encoding manager 122 is representative of functionality for performing various aspects of techniques for adjustable interleaving for communication data discussed herein.

The encoding manager 122 maintains an interleaving table 124 and a feedback table 126. According to various implementations, the interleaving table 124 is representative of functionality for storing and tracking attributes of data interleaving performed by the encoding module 118. The interleaving table 124, for instance, indicates default interleaving depth values for different types of communication media and/or combinations of communication media. In at least some implementations, the interleaving table 124 tracks an interleaving depth that is applied for interleaving encoded data for an active communication session. Further, the encoding manager 122 can dynamically adjust the interleaving depth for the communication session in the interleaving table 124 based on various events and changes that occur during the communication session.

The feedback table 126 is representative of functionality for storing and tracking various behaviors and parameters to be applied in response to feedback received regarding a communication session. For instance, the feedback table 126 specifies different interleaving depth adjustments to be applied in response to different types of feedback.

The environment 100 further includes a communication service 128, which is representative of a service to perform various tasks for management of communication between the client device 102 and the endpoint device 104. The communication service 128, for instance, can manage initiation, moderation, and termination of communication sessions. Examples of the communication service 128 include a VoIP service, an online conferencing service, a UC service, and so forth. In at least some implementations, the communication service 128 may be implemented as or be connected to a private branch exchange (PBX) in communication with a Public Switched Telephone Network ("PSTN") to enable voice communication between the client device 102 and the endpoint device 104.

According to one or more implementations, the communication clients 112, 116 are managed and/or hosted by the communication service 128. For instance, the communication clients 112, 116 represent interfaces to communication services provided by the communication service 128.

Further to the environment 100, the endpoint device 104 includes a wireless module 130 and an encoding manager 132. The wireless module 130 is representative of functionality for performing various wireless-related tasks for the endpoint device 104. In at least some implementations, the wireless module 130 represents an instance of the wireless module 114. For instance, the wireless module 130 is configured to perform data encoding and decoding, encryption and decryption, modulation and demodulation, and so forth. Thus, according to one or more implementations, attributes and functionalities discussed with reference to the wireless module 114 also apply to the wireless module 130.

The encoding manager 132 is representative of functionality to manage various aspects of encoding and decoding performed by the wireless module 130. In at least some implementations, the encoding manager 132 is configured to observe attributes of an incoming encoded data stream from the client device 102, and to provide feedback to the client device 102 to enable the client device 102 to dynamically adjust various aspects of data encoding performed by the encoding module 118. For instance, as detailed below, the encoding module 118 can adjust an interleaving depth applied to encoded data that is to be wirelessly transmitted by the client device 102. In at least some implementations, adjusting the interleaving depth enables the encoding module 118 to account for variations in signal quality, such as to increase a likelihood that a receiving device can correctly decode data that is received from the client device 102.

The various entities and functionalities discussed in the environment 100 may be implemented in software, hardware, firmware, and/or combinations thereof. Further details and implementations of the various entities of the environment 100 are discussed below.

Figure 2:
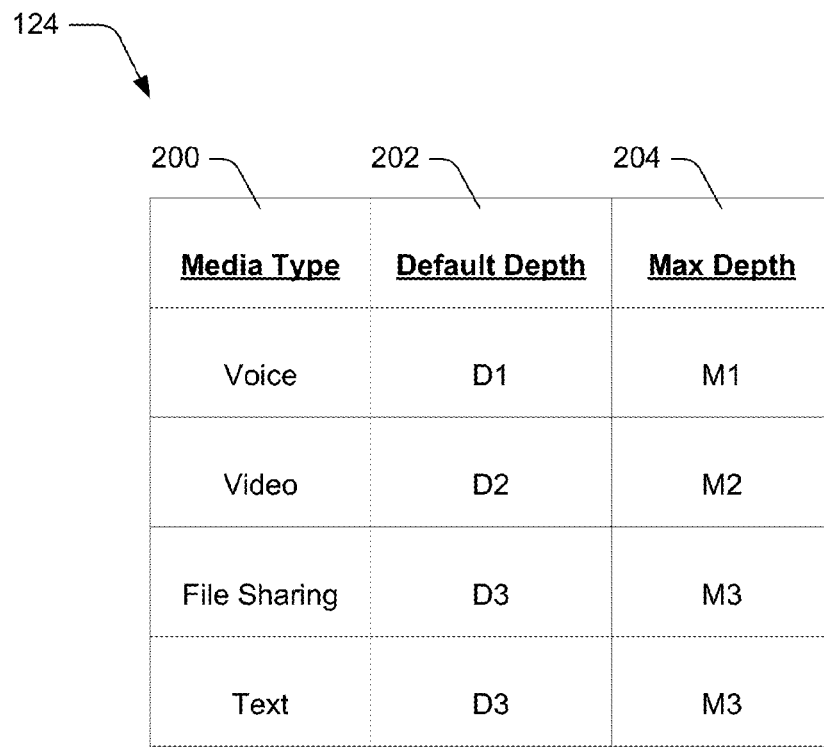
FIG. 2 depicts an example interleaving table and an example feedback table in accordance with one or more embodiments.
Figure 2:
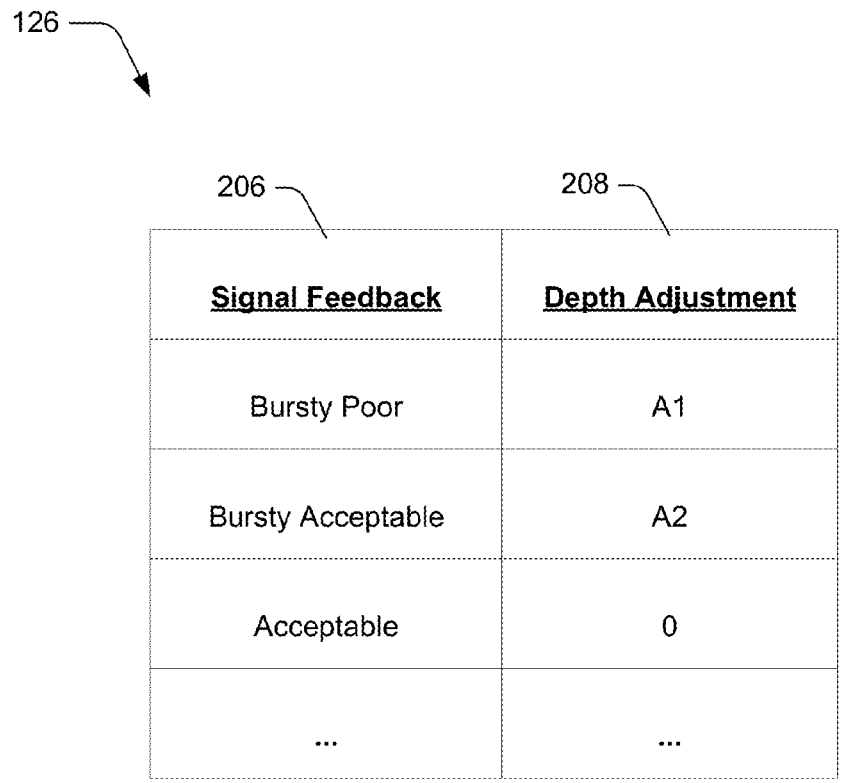

FIG. 2 depicts an example interleaving table 124 and an example feedback table 126 in accordance with one or more implementations. As referenced above, the interleaving table 124 specifies various interleaving depth values to be applied for interleaving data of a communication session. The depth values, for instance, vary according to types of communication media involved in a communication session.

The interleaving table 124 includes a media type column 200, a default depth column 202, and a max depth column 204. The media type column 200 includes different types of media that can be communicated as part of a communication session, such as voice data, video data, file sharing, text, and so forth.

The default depth column 202 specifies default interleaving depths to be applied to interleaving data of different media types. For instance, when a data stream is to be interleaved, the encoding manager 122 identifies a media type included in the data stream, and selects an interleaving depth for interleaving the data stream based on a default interleaving depth specified in the default depth column 202 for the media type. For instance, for voice data the default depth column 202 specifies a default interleaving depth of D1, for video a default depth of D2, for file sharing and text a default interleaving depth of D3, and so forth. Voice data is typically more sensitive to latency issues that can occur in response to interleaving, so in one or more implementations D1 is the smallest of the default depth values. For instance, D1<D2<D3.

The max depth column 204 specifies a maximum interleaving depth that may be applied for each of the media types specified in the media type column 200. For instance, for voice data the max depth column specifies a maximum interleaving depth of M1, for video a maximum depth of M2, for file sharing and text a maximum interleaving depth of M3, and so forth.

Voice data is typically more sensitive to latency issues that can occur in response to interleaving, so in one or more implementations M1 is the smallest of the maximum depth values. For instance, M1<M2<M3. In at least some implementations, the depth values specified in the max depth column 202 are enforced such that the encoding module 118 may not exceed the specified interleaving depth for a particular media type when interleaving a data stream of the media type. The encoding module 118, for example, may not exceed an interleaving depth of M1 when interleaving a data stream of voice data.

The feedback table 126 includes a feedback column 206 and the depth adjustment column 208. The feedback column 206 specifies different types of feedback that can be detected in response to wireless signal. For instance, the feedback column 206 identifies different signal qualities that can be detected by a receiving device, such as by the endpoint device 104 for wireless signal transmitted by the client device 102.

In this particular example, the feedback column 204 specifies example feedback values of bursty acceptable, bursty poor, and acceptable. Generally, bursty refers to errors that are detected in data that have a bursty (e.g., non-random) distribution within the data. The wireless module 114 and/or the encoding manager 122, for instance, are configured to inspect error distribution within a data stream received via a wireless signal, and to characterize the error distribution as either bursty or random. According to one or more implementations, acceptable signal and poor signal are distinguishable by comparing relative signal quality. For instance, a poor signal may exceed a data error threshold and/or have an average receive power that is below a receive power threshold. A data error threshold may be specified in various ways, such as in terms of a threshold data error rate, a threshold number of data errors, a threshold jitter value, and so forth. Further, an acceptable signal may be below a data error threshold and/or have an average receive power that is above a power threshold.

Accordingly, a signal that is indicated as being bursty acceptable may be determined to have a bursty error distribution but with a data quality that is acceptable. A signal that indicated as bursty poor may be determined to have a bursty error distribution with a data quality that is poor, e.g., not acceptable. Further, a signal that is indicated as being acceptable may be determined to have a non-bursty (e.g., random) error distribution and have a signal quality that is acceptable. These particular signal characterizations are provided for purpose of example only, and is to be appreciated that signal quality and other signal attributes may be defined in a variety of different ways in accordance with the claimed implementations.

The depth adjustment column 208 specifies interleaving depth adjustment values to be applied by the interleaver module 120 based on signal feedback. For instance, for a wireless signal that is determined to be bursty poor, a depth adjustment value of A1 is applied to increase a current interleaving value for the wireless signal. Further, for a wireless signal that is determined to be bursty acceptable, a depth adjustment value of A2 is applied to increase a current interleaving value for the wireless signal. For wireless signal that is determined to be acceptable (e.g., non-bursty), a depth adjustment value of zero (0) is specified. For instance, no interleaving depth adjustment is applied for wireless signal determined to have an acceptable signal quality. According to various implementations, 0<A2<A1.

According to various implementations, increasing an interleaving depth increases the likelihood that wireless data can be correctly decoded by a receiving device. However, increasing an interleaving depth also increases a signal latency at a receiving device. Thus, in at least some implementations, a depth adjustment to interleaving of a wireless signal is not permitted to exceed a maximum interleaving depth specified in the max depth column 204 of the interleaving table 124.

Having described an example environment in which the techniques described herein may operate, consider now some example implementation scenarios for adjustable interleaving for communication data in accordance with one or more embodiments.

Example Implementation Scenarios

The following section describes some example implementation scenarios for adjustable interleaving for communication data in accordance with one or more embodiments. The implementation scenarios may be implemented in the environment 100 discussed above, and/or any other suitable environment.

Figure 3:
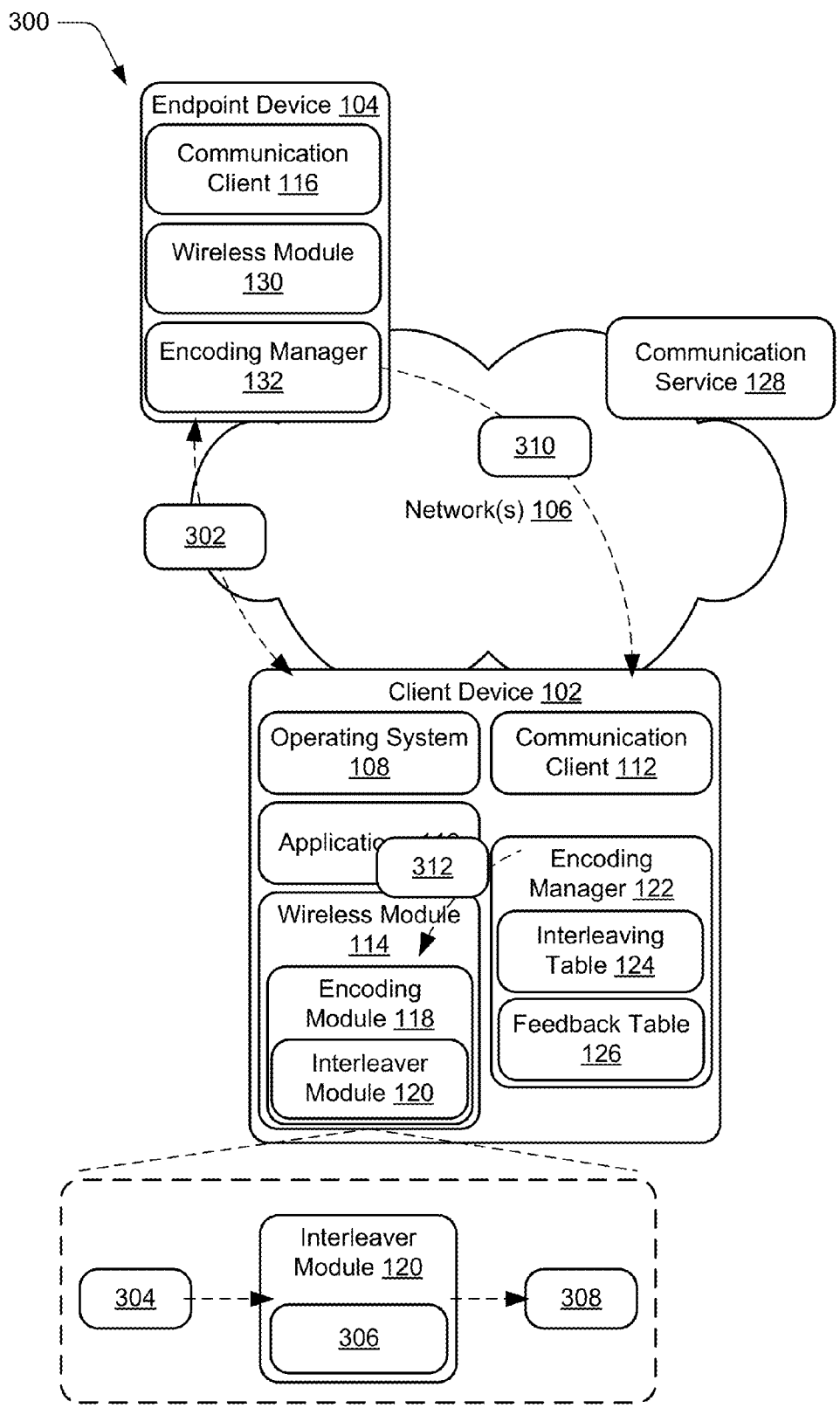
FIG. 3 depicts an example implementation scenario for determining an interleaving depth for data of a communication session in accordance with one or more embodiments.

FIG. 3 depicts an example implementation scenario 300 for determining an interleaving depth for data of a communication session in accordance with one or more implementations. In the scenario 300, the client device 102 is engaged in a communication session 302 with the endpoint device 104. The communication session 302, for instance, represents an exchange of communication media between the communication clients 112, 116. Examples of the communication session 302 include a VoIP call, a video call, a UC session, and/or combinations thereof.

Further to the scenario 300, the communication session 302 is communicated to the endpoint device 104 via a wireless connection between the client device 102 and the network 106. Prior to be transmitted by the client device 102, however, data 304 of the communication session 302 encoded by the encoding module 118 and the encoded data is interleaved by the interleaver module 120 according to an interleaving depth 306. The interleaving depth 306, for instance, is ascertained by matching a media type for the communication session 302 to a default interleaving depth specified in the interleaving table 124 for the media type. For example, the communication client 112 and/or the communication service 128 communicate a notification to the encoding manager 122 specifying one or more media types involved in the communication session 302. The encoding manager 122 then searches the interleaving table 124 with the media type(s) to select the interleaving depth 306 to be applied to data of the communication session 302. The encoding manager 122 communicates the interleaving depth 306 to the interleaver module 120, and the interleaver module 120 interleaves the data 304 of the communication session 302 according to the interleaving depth 306 to generate an interleaved data stream 308.

In one or more implementations, the communication session 302 may include multiple media types, such as voice media and video media. Accordingly, in at least some implementations, when a media stream includes multiple media types, a lowest maximum interleaving depth for a media type included in the media stream can be enforced. For instance, a maximum interleaving depth for voice data may be less than a maximum interleaving depth for video data. Thus, for a media stream with voice and video data, the maximum interleaving depth for voice data may be enforced for the media stream. Alternatively, a communication session with multiple media types may be communicated via different data streams that each include a different media type. Thus, the individual data streams may be interleaved according to an interleaving depth specified for a media types included in the respective streams.

While not expressly depicted in the scenario 300, various other processing may be applied to the data 304 of the communication session 302 prior to transmission by the client device 102, such as encryption, modulation, and so forth.

Further to the scenario 300, the endpoint device 104 receives the data stream of the communication session 302 and performs various processing on the data stream. For instance, the wireless module 130 demodulates and decrypts the data stream to reveal the interleaved data stream 308. The wireless module 130 then de-interleaves the interleaved data stream 308 to reveal a de-interleaved data stream, and performs a decoding process on the de-interleaved data stream. For instance, the wireless module 130 performs FEC decoding on the de-interleaved data stream in an attempt to recover correct data bits of the communication session 302 that were originally encoded by the client device 102.

According to various implementations, the endpoint device 104 determines signal attributes of the data stream of the communication session 302, such as whether errors in the data stream are bursty or random, a signal quality of the data stream, and so forth. For instance, the wireless module 130 and/or the encoding manager 132 ascertain signal attributes of the data stream.

Generally, a signal quality of a data stream can be determined in various ways. For instance, the signal quality can be determined based on an error rate (e.g., a bit error rate) detected as part of FEC decoding. In at least some implementations, for example, a threshold error rate can be defined. Thus, a data stream that exceeds that threshold error rate can be characterized as having a poor signal quality. A data stream that does not exceed the threshold error rate can be characterized as having an acceptable and/or good signal quality.

Additionally or alternatively, signal quality can be determined based on average receive power for the signal. For instance, a data signal that has an average receive power that exceeds a threshold receive power can be characterized as having an acceptable signal quality. However, a data signal that has an average receive power that does not exceed the threshold receive power can be characterized as having a poor signal quality.

Continuing with the scenario 300, the endpoint device 104 returns signal feedback 310 to the client device 102. Generally, the signal feedback 310 specifies various attributes of the media stream for the communication session 302. Such attributes include signal quality, signal strength, error periodicity (e.g., whether errors in the signal are bursty or random), and so forth. The encoding manager 122 of the client device 102 receives the signal feedback 310 and determines whether to adjust the interleaving depth 306 based on the signal feedback 310.

In at least some implementations, the encoding manager 122 compares the signal feedback 310 to the feedback table 126 to ascertain whether and/or how the interleaving depth 306 is to be adjusted. For instance, the encoding manager 122 matches the signal feedback 310 to a signal feedback identified in the signal feedback column 206, and selects a corresponding depth adjustment value from the depth adjustment column 208. If the encoding manager 122 ascertains that the interleaving depth 304 is to be adjusted (e.g., increased), the encoding manager 122 communicates an interleaving adjustment value 312 to the interleaver module 120. However, if the encoding manager 122 ascertains that based on the signal feedback 306 the interleaving depth 304 is not to be adjusted, the encoding manager 122 does not communicate the interleaving adjustment value 312 to the interleaver module 120.

As indicated above, whether and how the interleaving adjustment value 312 is applied to a media stream of the communication session 302 may depend on a maximum interleaving value specified for a media type included in the media stream. For instance, the interleaving adjustment value 312 may be applied to adjust the interleaving depth 306 up to a maximum interleaving value specified for the media type, such as specified by the interleaving table 124. Further, if the interleaving depth 306 is already at a specified maximum depth, the interleaving adjustment value 312 may not be applied to adjust the interleaving depth 306. In at least some implementations, if the interleaving depth 306 is at a maximum depth and signal quality of the communication session 302 is still determined to be poor, adjustment to FEC encoding of the communication session 302 may be implemented. An example way of adjusting FEC encoding of a data stream is discussed below.

According to various implementations, the scenario 300 may be performed dynamically (e.g., periodically and/or continuously) while the communication session 302 is in progress. Thus, interleaving depth may be adjusted dynamically and in real-time while the communication session 302 is in progress, such as to account for changes in signal attributes (e.g., signal strength, signal quality, and so forth) that occur during the communication session.

While the scenario 300 is discussed with reference to increasing an interleaving depth in response to decreases in signal quality, it is to be appreciated that implementations discussed herein may be employed to decrease interleaving depth. For instance, the signal feedback 310 may indicate that signal quality for the communication session 302 is high. Thus, the encoding manager 122 may determine that based on the high signal quality, the interleaving depth 306 may be decreased. Decreasing the interleaving depth 306 may reduce latency in transmission of the communication session 302 and reduce processing bandwidth used to interleave the data stream of the communication session 302.

Figure 4:
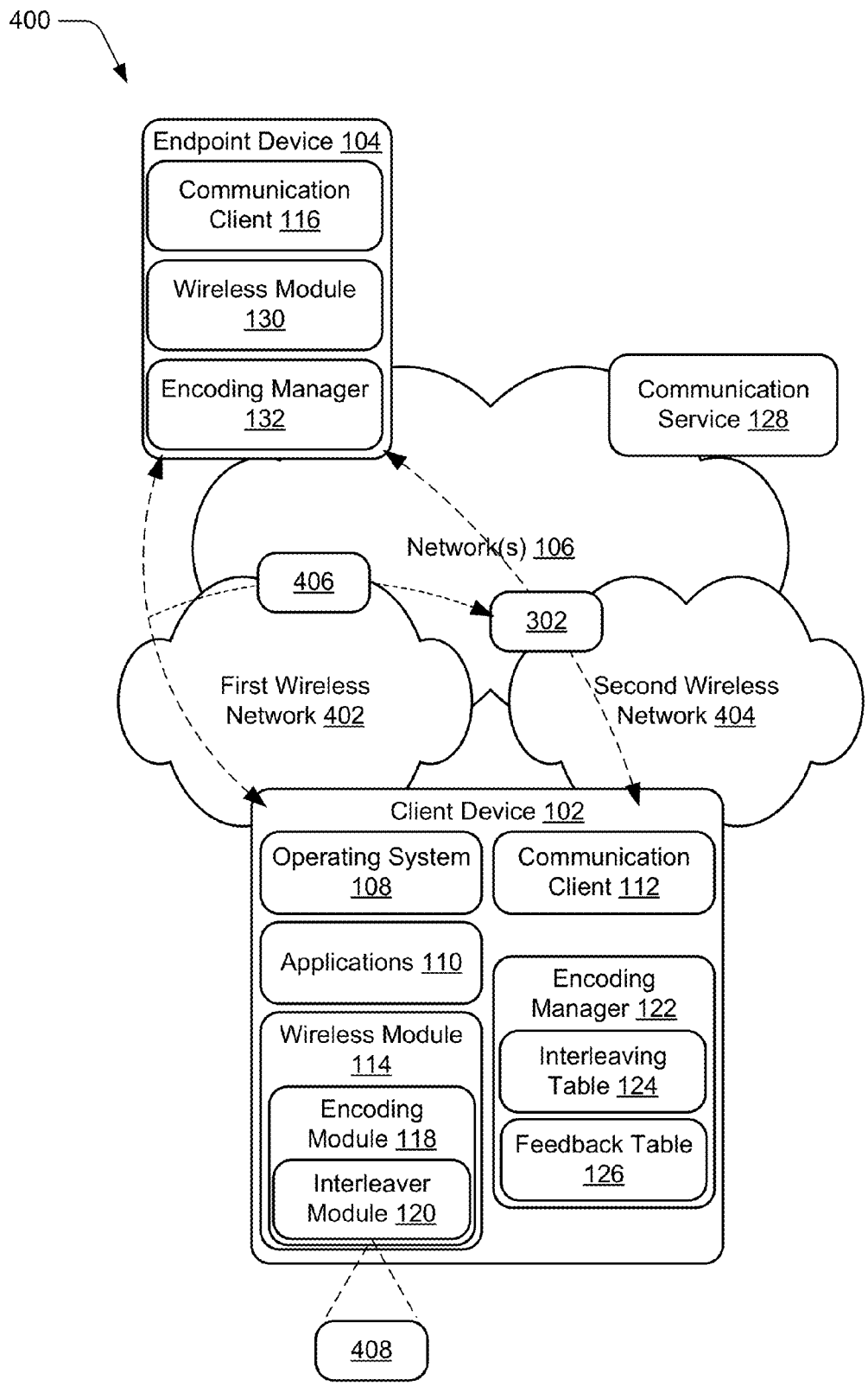
FIG. 4 depicts an example implementation scenario for reconfiguring an interleaver in accordance with one or more embodiments.

FIG. 4 depicts an example implementation scenario 400 for reconfiguring an interleaver in accordance with one or more implementations. In at least some implementations, the scenario 400 represents an extension and/or variation of the scenario 300 discussed above. In the scenario 400, the client device 102 is engaged in the communication session 302 with the endpoint device 104. Further, a data stream for the communication session 302 is transmitted wirelessly by the client device 102 over a first network 402. The first network 402 may be implemented via any suitable wireless technology, such as wireless cellular, WiFi™, Bluetooth, and so forth.

Further to the scenario, the client device 102 detects that a second wireless network 404 is available, and connects to the second wireless network 404. The second wireless network 404 may be implemented via any suitable wireless technology, such as wireless cellular, WiFi™, Bluetooth, and so forth. In this particular scenario, the second network 404 is implemented via a different wireless technology than the first wireless network 402. For instance, the first wireless network 402 is a wireless local area network (LAN), and the second wireless network 404 is a wireless cellular network, such as a Long Term Evolution (LTE) network. These examples are not intended to be limiting, however, and the first wireless network 402 and the second wireless network 404 may be implemented via any suitable differing types of wireless technologies.

In response to connecting to the second wireless network 404, the client device 102 implements a wireless handover 406 of the communication session 302 to the second wireless network 404. For instance, connectivity for routing the communication session 302 is switched from the first wireless network 402 to the second wireless network 404. Further, in response to the wireless handover 406, the client device 102 implements a mode change 408 for the interleaver module 120 to accommodate the change in wireless technology from the first wireless network 402 to the second wireless network 404. For instance, the mode change 408 involves a change in interleaving mode (e.g., configuration and/or design) for the interleaver module 120. Examples of different interleaving modes include a block interleaving mode, a convolutional interleaving mode, a random interleaving mode, a prime interleaving mode, a tree-based interleaving mode, and so forth. Generally, the different interleaving modes specify a type of interleaving that is performed on a data stream of the communication session 302.

In some alternative or additional implementations, the endpoint device 104 provides feedback to the client device 102 indicating that the data stream of the communication session 302 has changed based on the change in connectivity from the first wireless network 402 to the second wireless network 404. For instance, the endpoint device 104 detects that the data stream of the communication session 302 is changed from being transmitted via a wireless technology of the first wireless network 402, to being transmitted via a wireless technology of the second wireless network 404. Accordingly, the endpoint device 104 communicates the feedback to the client device 102, and the client device 102 changes the interleaving mode based on the feedback.

Consider, for example, that the interleaver module 120 is configured in a block interleaving mode when connected to the first wireless network 402 such that a data stream of the communication session 302 is interleaved in the block interleaving mode. However, in response to connecting to the second wireless network 404 and performing the wireless handover 406, the interleaver module 120 is reconfigured in a convolutional interleaving mode such that the data stream of the communication session 302 is interleaved in the convolutional interleaving mode prior to be transmitted by the client device over the second wireless network 404. Generally, changing the interleaving mode accommodates changes in wireless technologies, such as to select an interleaving mode that is best suited to a particular wireless technology.

Although the scenario 400 is discussed with reference to a single change in interleaving mode, it is to be appreciated that implementations discussed herein can be employed to perform multiple changes in interleaving mode, such as to accommodate multiple changes in network type. For instance, an interleaving mode used to interleave a data stream of a communication session may be changed multiple times while the communication session is in progress, such as in response to multiple handovers of the communication session to different wireless networks.

Accordingly, the scenarios 300, 400 illustrate that implementations discussed herein enable an interleaver configuration (e.g., depth, mode, and so forth) to be dynamically reconfigured in response to various events, such as changes in signal attributes (e.g., signal quality), changes in network type, and so forth.

Having discussed some example implementation scenarios, consider now a discussion of some example procedures in accordance with one or more embodiments.

Example Procedures

The following discussion describes some example procedures for adjustable interleaving for communication data in accordance with one or more embodiments. The example procedures may be employed in the environment 100 of FIG. 1, the system 900 of FIG. 9, and/or any other suitable environment. The procedures, for instance, represent procedures for implementing the example implementation scenarios discussed above. In at least some embodiments, the steps described for the various procedures can be implemented automatically and independent of user interaction.

Figure 5:
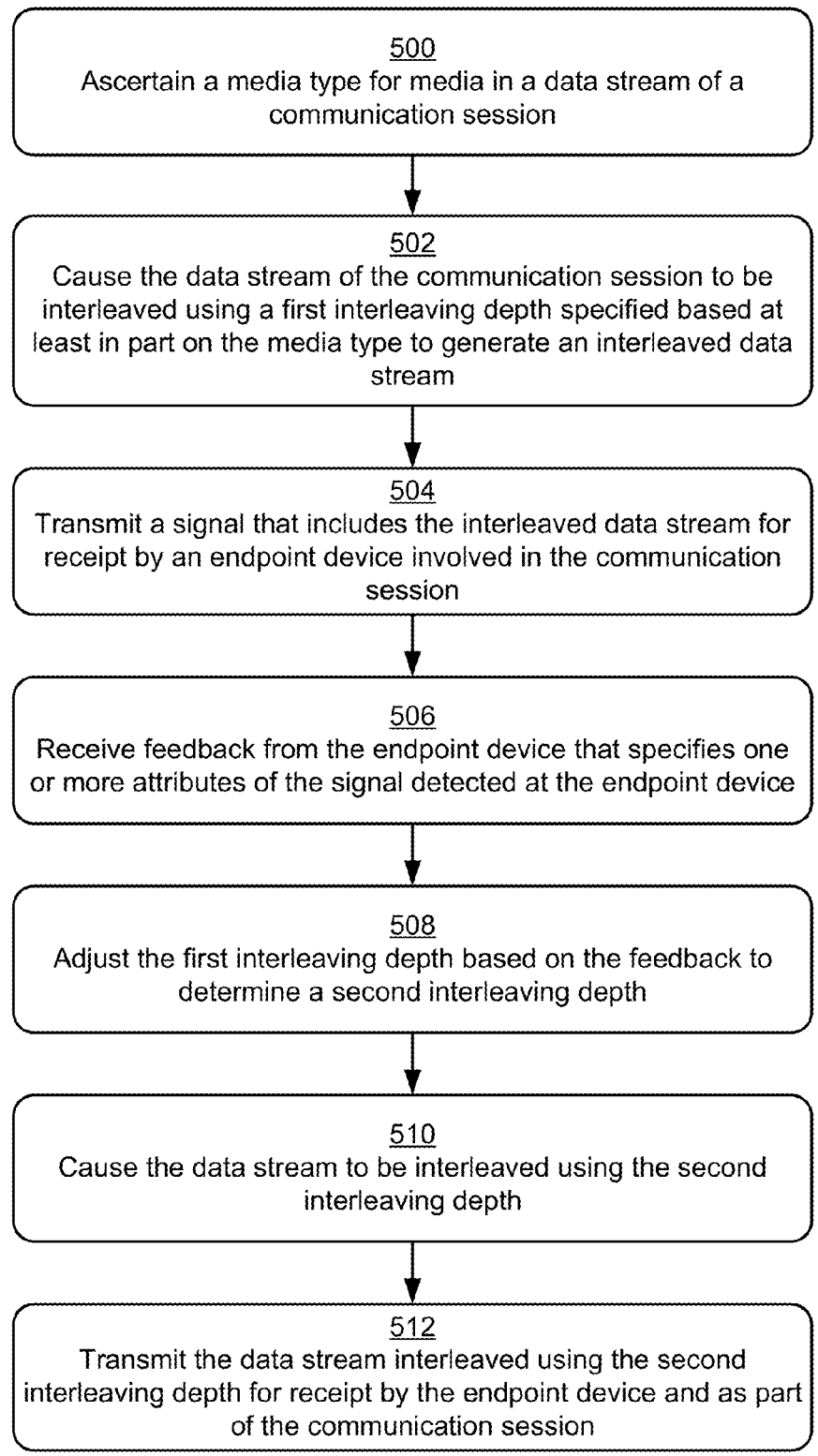
FIG. 5 is a flow diagram that describes steps in a method for determining an interleaving depth for interleaving a data stream of a communication session in accordance with one or more embodiments.

FIG. 5 is a flow diagram that describes steps in a method in accordance with one or more embodiments. The method describes an example procedure for determining an interleaving depth for interleaving a data stream of a communication session in accordance with one or more implementations. In at least some implementations, the method is performed at a transmitting device of a communication session, such as at the client device 102.

Step 500 ascertains a media type for media in a data stream of a communication session. A communication session, for instance, is initiated by a user via interaction with the communication client 112. The encoding manager 122 determines a media type or combination of media types included in the communication session, such as by inspecting a modality flag that identifies the media type and that is included in a data stream of the communication session.

Step 502 causes the data stream of the communication session to be interleaved using a first interleaving depth specified based at least in part on the media type to generate an interleaved data stream. The encoding manager 122, for instance, matches the media type to a default interleaving depth specified in the interleaving table 124 for the media type. The encoding manager 122 communicates the interleaving depth to the interleaver module 120, which utilizes the interleaving depth to interleave the data stream.

Step 504 transmits a signal that includes the interleaved data stream for receipt by an endpoint device involved in the communication session. The interleaved data stream, for instance, is further processed after being interleaved, such as by encoding and modulating the interleaved data stream. The client device 102 then transmits the interleaved data stream as a wireless and/or wired signal over the network 106 for receipt by the endpoint device 104.

Step 506 receives feedback from the endpoint device that specifies one or more attributes of the signal detected at the endpoint device. The client device 102, for example, receives feedback from the endpoint device 104 specifying various attributes of the data stream of the communication session 302. In at least some implementations, the feedback is received as auxiliary data included with a data stream of the communication session transmitted by the endpoint device 104. Alternatively or additionally, the feedback may be received separately (e.g., out-of-band) from a data stream of the communication session.

According to various implementations, the feedback may specify a general quality of the data stream received at the endpoint device, such as "good," "acceptable," "poor," and so forth. Alternatively or additionally, the feedback may include quality and/or error statistics for the data stream. Example statistics that can be specified by the feedback include:

(1) Mean Opinion Score (MOS): This attribute can be leveraged to specify a MOS for a communication session. The attribute, for instance, can be used to indicate an overall quality of a communication session.

(2) Jitter Inter-Arrival Time: This attribute can be leveraged to specify jitter values for a communication session. The attribute, for instance, can be used to indicate that a jitter value or values have increased, e.g., have exceeded a specified jitter value threshold.

(3) Packet Loss Rate: This attribute can be leveraged to specify a packet loss rate for a communication session. The attribute, for instance, can be used to indicate that a packet loss rate has increased, e.g., has exceeded a specified packet loss rate value threshold.

(4) Packet Error Rate: This attribute can be leveraged to specify a packet error rate for a communication session. The attribute, for instance, can be used to indicate that a packet error rate has increased, e.g., has exceeded a specified packet error rate value threshold.

(5) Round Trip Delay (RTD): This attribute can be leveraged to specify RTD values for packets in communication sessions. The attribute, for instance, can be used to indicate that RTD values for packets have increased, e.g., have exceeded a specified RTD value threshold.

(6) Concealment Ratio: This attribute can be leveraged to specify a cumulative ratio of concealment time over speech time observed after starting a communication session. The attribute, for instance, can be used to specify that a concealment ratio has increased, e.g., has exceeded a specified concealment ratio value threshold.

Step 508 adjusts the first interleaving depth based on the feedback to determine a second interleaving depth. For instance, the encoding manager 122 ascertains based on the feedback that the data stream received at the endpoint device 104 is below a threshold quality. Thus, the encoding manager 122 increases the first interleaving depth to determine the second interleaving depth. The encoding manager 122, for example, determines an adjustment value by comparing the signal quality to a depth adjustment value for the signal quality, such as using the feedback table 126.

In at least some implementations, the interleaving depth is adjusted subject to a maximum interleaving depth for the particular media type. For instance, an interleaving depth for the media type may not exceed a maximum specified interleaving depth for the media type.

Step 510 causes the data stream to be interleaved using the second interleaving depth. The encoding manager 122, for example, communicates the adjusting interleaving depth to the interleaver module 120, which utilizes the adjusted interleaving depth to interleave the data stream of the communication session. Thus, the interleaving depth is dynamically adjusted and applied to interleaving of the data stream while the communication session is in progress.

Step 512 transmits the data stream interleaved using the second interleaving depth for receipt by the endpoint device and as part of the communication session. The client device 102, for instance, transmits the data stream over the network 106 for receipt by the endpoint device 104.

Figure 6:
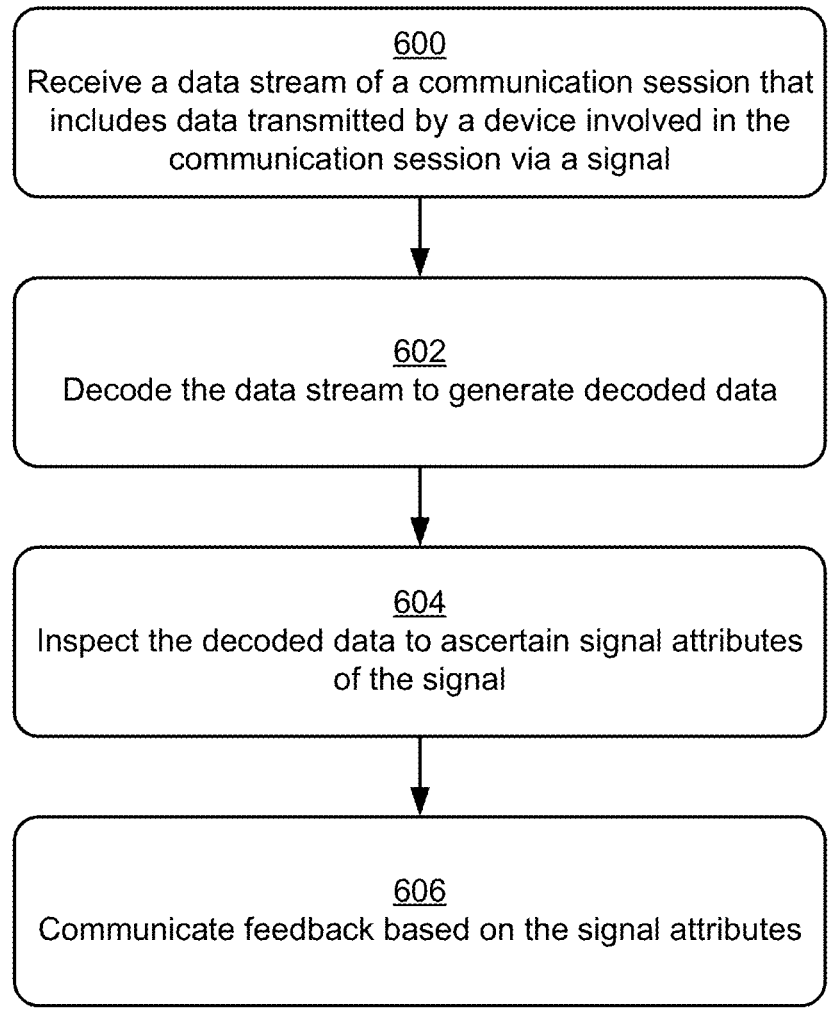
FIG. 6 is a flow diagram that describes steps in a method for generating feedback for a data stream of a communication session in accordance with one or more embodiments.

FIG. 6 is a flow diagram that describes steps in a method in accordance with one or more embodiments. The method describes an example procedure for generating feedback for a data stream of a communication session in accordance with one or more implementations. In at least some implementations, the method is an extension of the procedure described above with reference to FIG. 5. The method, for instance, may be performed at a receiving device in a communication session, such as by the endpoint device 104.

Step 600 receives a data stream of a communication session that includes data transmitted by a device involved in the communication session via a signal. The endpoint device 104, for instance, receives a data stream that includes data transmitted wirelessly by the client device 102 as part of a communication session between the endpoint device 104 and the client device 102.

Step 602 decodes the data stream to generate decoded data. The wireless module 130, for example, performs various decoding processes on the data stream, such as demodulation, decryption, de-interleaving, FEC decoding, and so forth.

Step 604 inspects the decoded data to ascertain signal attributes of the signal. The wireless module 130, for instance, inspects the decoded data for different types of errors and other signal properties, such as packet delay, packet loss rate, jitter, packet errors (e.g., number and/or rate), signal strength, and so forth. Alternatively or additionally, the wireless module 130 characterizes whether errors detected in the decoded data occur randomly or are bursty.

Step 606 communicates feedback based on the signal attributes. The feedback, for instance, identifies attributes, such as by identifying error types and/or quantifying errors. Alternatively or additionally, the feedback characterizes a signal quality of the wireless signal, such as "good," "acceptable," "bad," "bursty errors," "random errors," and so forth. In at least some implementations, the feedback is communicated to a device involved in the communication session, such as by the endpoint device 104 to the client device 102. Thus, the client device 102 may ascertain whether to perform an action based on the feedback, such as whether to adjust an interleaving depth, correction coding, and so forth.

Figure 7:
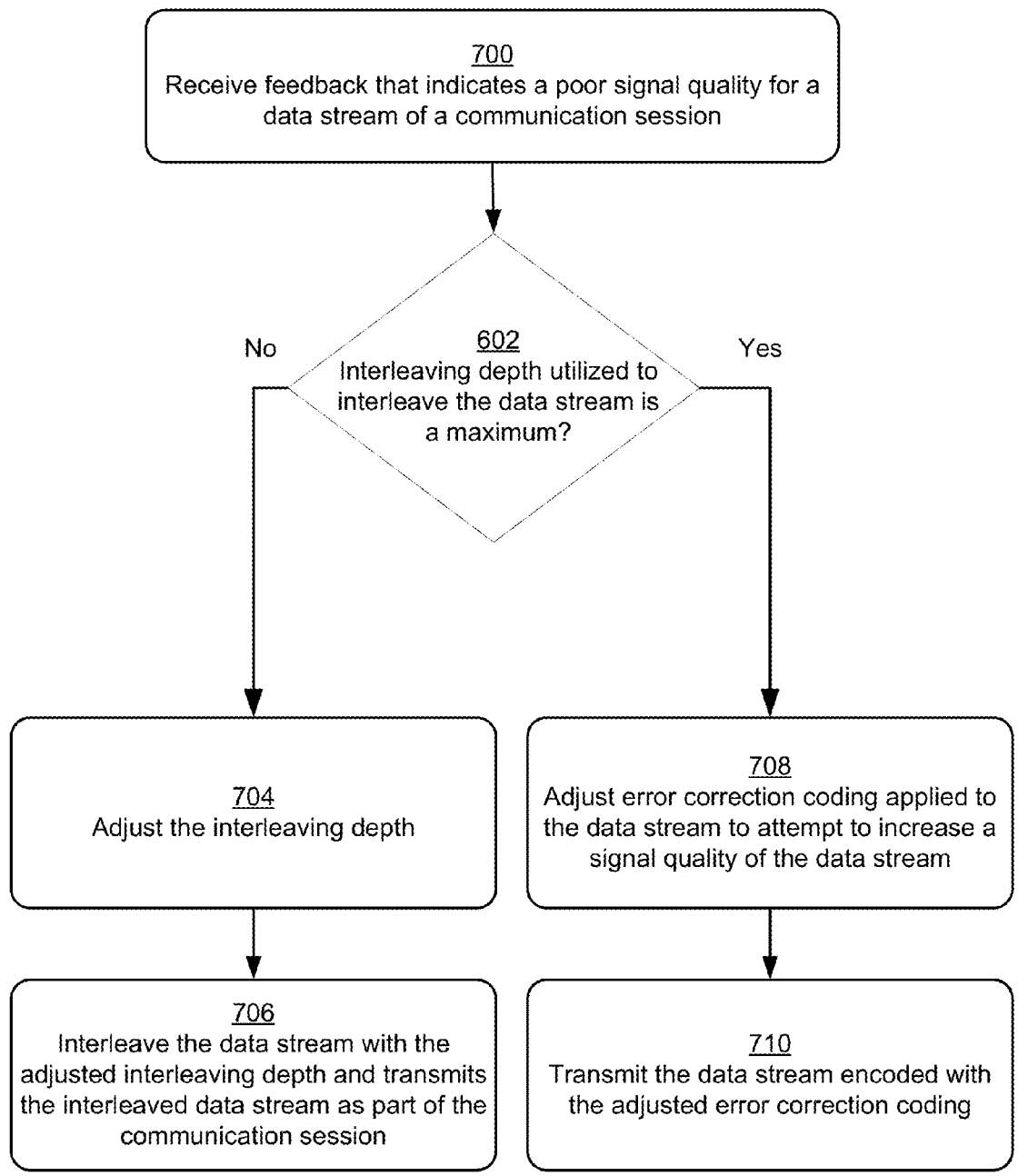
FIG. 7 is a flow diagram that describes steps in a method for adjusting error correction applied to a data stream of a communication session in accordance with one or more embodiments.

FIG. 7 is a flow diagram that describes steps in a method in accordance with one or more embodiments. The method describes an example procedure for adjusting error correction applied to a data stream of a communication session in accordance with one or more implementations. In at least some implementations, the method is an extension of the procedure described above with reference to FIG. 5.

Step 700 receives feedback that indicates a poor signal quality for a data stream of a communication session. The client device 102, for instance, receives the feedback from the endpoint device 104 while the communication session 302 is in progress. In at least some implementations, the feedback pertains to a data stream that has been interleaved using an adjusted interleaving depth. For example, the feedback represents further feedback from the endpoint device 104.

Step 702 ascertains whether an interleaving depth utilized to interleave the data stream is a maximum interleaving depth for a media type included in the media stream. The encoding manager 122, for instance, compares the current interleaving depth to a maximum interleaving depth specified in the interleaving table 124 for the media type.

In an event that the interleaving depth is not a maximum interleaving depth for the media type ("No"), step 704 adjusts the interleaving depth. The encoding manager 122, for instance, increases the interleaving depth. According to various implementations, the interleaving depth may be increased up to the maximum interleaving depth. Generally, increasing the interleaving depth assists in increasing a signal quality for wireless signal received by the receiving device. Step 706 interleaves the data stream with the adjusted interleaving depth and transmits the interleaved data stream as part of the communication session. The data stream, for instance, is transmitted for receipt by an endpoint device involved in the communication session.

In an event that the interleaving depth is a maximum interleaving depth for the media type ("Yes"), step 708 adjusts error correction coding applied to the data stream to attempt to increase a signal quality of the data stream. For instance, the encoding manager 122 notifies the encoding module 118 to decrease a coding rate of the data stream, such as an FEC coding rate. Generally, decreasing the code rate increases data redundancy of the data stream and thus increases the likelihood that bits of the data stream that are transmitted wirelessly can be correctly decoded by a receiving device.

Step 710 transmits the data stream encoded with the adjusted error correction coding. The data stream, for instance, is transmitted for receipt by an endpoint device involved in the communication session.

Figure 8:
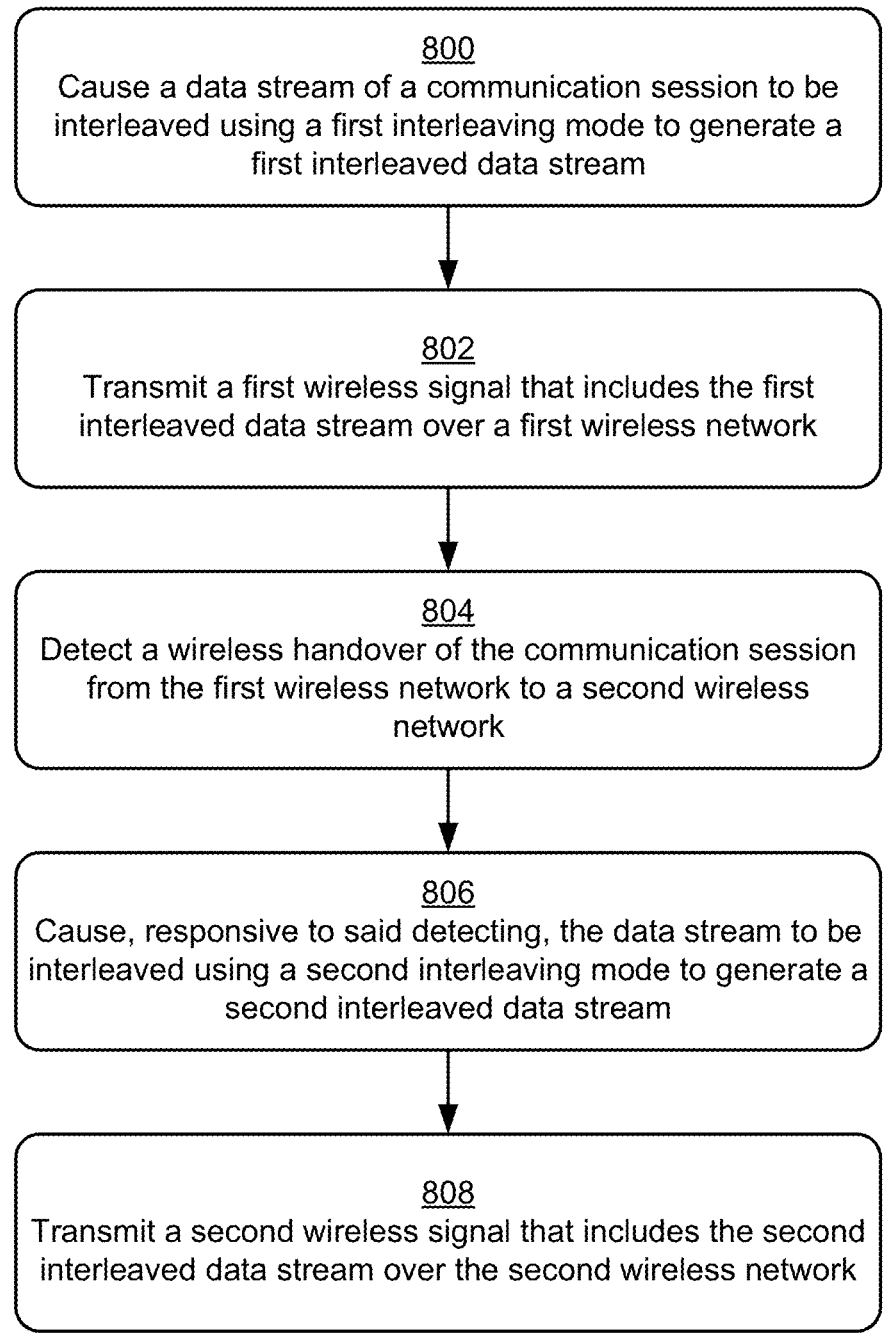
FIG. 8 is a flow diagram that describes steps in a method for changing an interleaving mode for data of a communication session in accordance with one or more embodiments.

FIG. 8 is a flow diagram that describes steps in a method in accordance with one or more embodiments. The method describes an example procedure for changing an interleaving mode for data of a communication session in accordance with one or more implementations. In at least some implementations, the method is an extension of the procedure described above with reference to FIG. 5.

Step 800 causes a data stream of a communication session to be interleaved using a first interleaving mode to generate a first interleaved data stream. The interleaver module 120, for instance, interleaves the data stream according to an interleaving mode that is suitable to a particular wireless network over which a wireless signal including the data stream is transmitted. Examples of different interleaving modes are described above.

Step 802 transmits a first wireless signal that includes the first interleaved data stream over a first wireless network. The first wireless signal, for instance, is transmitted for receipt by an endpoint device involved in the communication session. For example, the first wireless signal is transmitted by the client device 102 over a particular wireless network for receipt by the endpoint device 104.

Step 804 detects a wireless handover of the communication session from the first wireless network to a second wireless network. The client device 102, for instance, connects to a different network. Thus, a wireless handover is performed for the communication session to the different wireless network. According to various implementations, the second wireless network is implemented via a different wireless technology than the first wireless network.

Step 806 causes, responsive to said detecting, the data stream to be interleaved using a second interleaving mode to generate a second interleaved data stream. The second interleaving mode, for instance, is determined based on a wireless technology used to implement the second wireless network. Thus, the first interleaving mode and the second interleaving mode represent different interleaving modes. Generally, the second interleaved data stream includes data of the communication session.

Step 808 transmits a second wireless signal that includes the second interleaved data stream over the second wireless network. The second wireless signal, for instance, is transmitted wirelessly and for receipt by an endpoint device as part of the communication session. Generally, the first interleaved data stream and the second interleaved data stream are generated as part of a single communication session, e.g., a single continuous communication session. Accordingly, a switch between interleaving modes used to interleave data of a communication session can be performed dynamically and seamlessly while the communication session is progress.

Having discussed some example procedures, consider now a discussion of an example system and device in accordance with one or more embodiments.

Example System and Device

Figure 9:
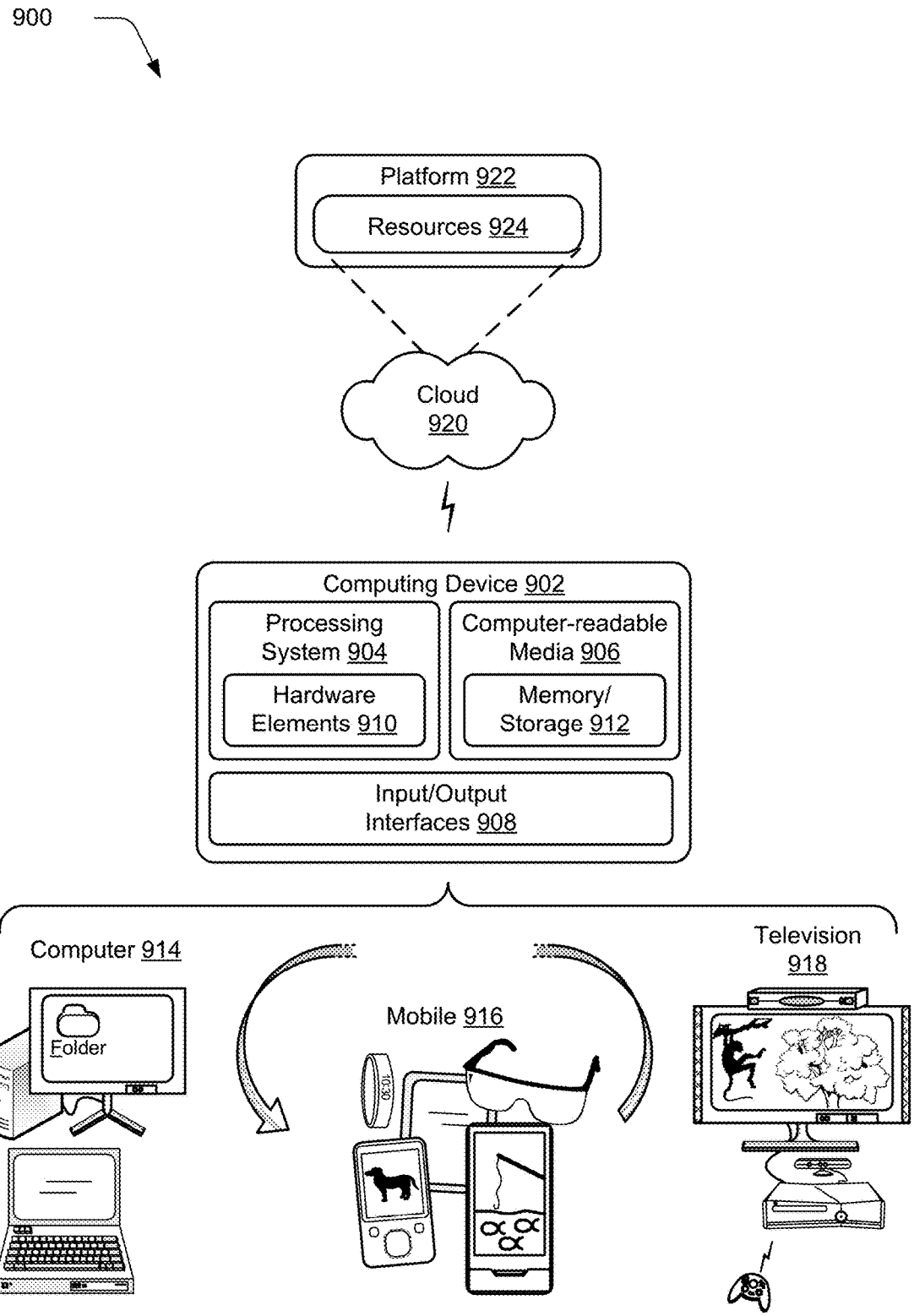
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, the client device 102 and/or the endpoint device 104 discussed above with reference to FIG. 1 can be embodied as the computing device 902. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, wearable devices, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. For example, functionalities discussed with reference to the entities of the environment 100 may be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include the following examples:

Example 1

A system including: at least one processor; and one or more computer-readable storage media including instructions stored thereon that, responsive to execution by the at least one processor, cause the system perform operations including: causing a data stream of a communication session to be interleaved using a first interleaving depth specified based at least in part on a media type included in the communication session to generate an interleaved data stream; transmitting a signal that includes the interleaved data stream for receipt by an endpoint device involved in the communication session; receiving feedback from the endpoint device that specifies one or more attributes of the signal detected at the endpoint device; adjusting the first interleaving depth based on the feedback to determine a second interleaving depth, and causing the data stream to be interleaved using the second interleaving depth; and transmitting the data stream interleaved using the second interleaving depth for receipt by the endpoint device and as part of the communication session.

Example 2

A system as described in example 1, wherein the communication session is implemented via an application that is executable at an application layer of the system.

Example 3

A system as described in one or more of examples 1 or 2, wherein the first interleaving depth is determined from a set of pre-specified interleaving depths that specify different interleaving depths for different media types.

Example 4

A system as described in one or more of examples 1-3, wherein the first interleaving depth is determined by matching the media type to a corresponding interleaving depth in a table that specifies different interleaving depths for different media types.

Example 5

A system as described in one or more of examples 1-4, wherein the feedback specifies a signal quality of the signal detected at the endpoint device.

Example 6

A system as described in one or more of examples 1-5, wherein the feedback specifies a signal quality of the signal detected at the endpoint device, and wherein said adjusting utilizes an adjustment value specified for the signal quality to adjust the first interleaving depth.

Example 7

A system as described in one or more of examples 1-6, wherein the feedback specifies a poor signal quality of the signal detected at the endpoint device, and wherein said adjusting includes increasing the first interleaving depth to determine the second interleaving depth.

Example 8

A system as described in one or more of examples 1-7, wherein the feedback specifies a poor signal quality of the signal detected at the endpoint device, wherein said adjusting includes increasing the first interleaving depth to determine the second interleaving depth, and wherein said increasing is subject to a specified maximum interleaving depth for the media type.

Example 9

A system as described in one or more of examples 1-8, wherein said adjusting the first interleaving depth is performed while the communication session is in progress.

Example 10

A system as described in one or more of examples 1-9, wherein the operations further include: receiving further feedback that indicates a poor signal quality for the data stream interleaved using the second interleaving depth; ascertaining that the second interleaving depth is a maximum interleaving depth for the media type included in the communication session; and adjusting error correction coding applied to the data stream to attempt to increase a signal quality of the data stream.

Example 11

A system as described in one or more of examples 1-10, wherein the operations further include: receiving further feedback that indicates a poor signal quality for the data stream interleaved using the second interleaving depth; ascertaining that the second interleaving depth is a maximum interleaving depth for the media type included in the communication session; and adjusting error correction coding applied to the data stream to decrease a code rate applied to the data stream to attempt to increase a signal quality of the data stream.

Example 12

A computer-implemented method including: ascertaining a media type for media in a data stream of a communication session; causing the data stream of the communication session to be interleaved using an interleaving depth specified based at least in part on the media type included in the communication session to generate an interleaved data stream; and transmitting a signal that includes the interleaved data stream for receipt by an endpoint device involved in the communication session.

Example 13

A method as described in example 12, wherein said ascertaining includes identifying a modality flag that specifies the media type.

Example 14

A method as described in one or more of examples 12 or 13, further including determining the interleaving depth by matching the media type to a set of interleaving depths specified for different media types.

Example 15

A method as described in one or more of examples 12-14, further including: receiving feedback from the endpoint device that specifies one or more attributes of the signal detected at the endpoint device; adjusting the first interleaving depth based on the feedback to determine a second interleaving depth, and causing the data stream to be interleaved using the second interleaving depth; and transmitting the data stream interleaved using the second interleaving depth for receipt by the endpoint device and as part of the communication session.

Example 16

A method as described in one or more of examples 12-15, further including: receiving feedback from the endpoint device that specifies a poor signal quality of the signal detected at the endpoint device; increasing the first interleaving depth based on the feedback to determine a second interleaving depth, and causing the data stream to be interleaved using the second interleaving depth; and transmitting the data stream interleaved using the second interleaving depth for receipt by the endpoint device and as part of the communication session.

Example 17

A computer-implemented method including: causing a data stream of a communication session to be interleaved using a first interleaving mode to generate a first interleaved data stream; transmitting a first wireless signal that includes the first interleaved data stream over a first wireless network and for receipt by an endpoint device involved in the communication session; detecting a wireless handover of the communication session from the first wireless network to a second wireless network; causing, responsive to said detecting, the data stream to be interleaved using a second interleaving mode to generate a second interleaved data stream; and transmitting a second wireless signal that includes the second interleaved data stream over the second wireless network and for receipt by the endpoint device as part of the communication session.

Example 18

A method as described in example 17, further including determining that the first wireless network and the second wireless network are implemented via different wireless technologies, and wherein the second interleaving mode is determined based on a wireless technology utilized by the second wireless network.

Example 19

A method as described in one or more of examples 17 or 18, wherein said detecting is based on feedback from the endpoint device indicating the wireless handover.

Example 20

A method as described in one or more of examples 17-19, wherein said causing the data stream to be interleaved using the second interleaving mode is performed while the communication session is in progress.

CONCLUSION

Techniques for adjustable interleaving for communication data are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one processor; and
   one or more computer-readable storage media including instructions stored thereon that, responsive to execution by the at least one processor, cause the system to perform operations including:
      causing a data stream of a communication session to be interleaved using a first interleaving depth specified based at least in part on a media type included in the communication session to generate an interleaved data stream;
      transmitting a signal that includes the interleaved data stream for receipt by an endpoint device involved in the communication session;
      receiving feedback from the endpoint device that specifies a distribution of errors in the data stream received at the endpoint device;
      comparing the distribution of errors in the data stream to a data error threshold, and determining an adjustment value for the first interleaving depth based on the distribution of errors in the data stream exceeding the data error threshold;
      applying the adjustment value to the first interleaving depth to define a second interleaving depth;
      determining that the second interleaving depth does not exceed a maximum interleaving depth defined for the media type included in the communication session;
      causing the data stream to be interleaved using the second interleaving depth; and
      transmitting the data stream interleaved using the second interleaving depth for receipt by the endpoint device and as part of the communication session.

2. A system as recited in claim 1, wherein the communication session is implemented via an application that is executable at an application layer of the system.

3. A system as recited in claim 1, wherein the first interleaving depth is determined from a set of pre-specified interleaving depths that specify different interleaving depths for different media types.

4. A system as recited in claim 1, wherein the first interleaving depth is determined by matching the media type to a corresponding interleaving depth in a table that specifies different interleaving depths for different media types.

5. A system as recited in claim 1, wherein the feedback further specifies a signal quality of the signal detected at the endpoint device.

6. A system as recited in claim 1, wherein the feedback further specifies a signal quality of the signal detected at the endpoint device, and wherein said determining the adjustment value for the first interleaving depth utilizes the signal quality specified by the feedback.

7. A system as recited in claim 1, wherein the feedback indicates a poor signal quality of the signal detected at the endpoint device based on the distribution of errors in the data stream, and wherein said applying the adjustment value to the first interleaving depth comprises increasing the first interleaving depth to define the second interleaving depth.

8. A system as recited in claim 1, wherein the feedback indicates a poor signal quality of the signal detected at the endpoint device, wherein the media type is voice data, and wherein said applying the adjustment value to the first interleaving depth comprises increasing the first interleaving depth to define the second interleaving depth such that the second interleaving depth does not exceed a specified maximum interleaving depth for the voice data.

9. A system as recited in claim 1, wherein said applying the adjustment value to the first interleaving depth is performed while the communication session is in progress.

10. A system as recited in claim 1, wherein the operations further include:
    receiving further feedback that indicates a poor signal quality for the data stream interleaved using the second interleaving depth;
    ascertaining that the second interleaving depth is the maximum interleaving depth for the media type included in the communication session; and
    adjusting error correction coding applied to the data stream to attempt to increase a signal quality of the data stream.

11. A system as recited in claim 1, wherein the operations further include:
    receiving further feedback that indicates a poor signal quality for the data stream interleaved using the second interleaving depth;
    ascertaining that the second interleaving depth is the maximum interleaving depth for the media type included in the communication session; and
    adjusting error correction coding applied to the data stream to decrease a code rate applied to the data stream to attempt to increase a signal quality of the data stream.

12. A computer-implemented method comprising:
    ascertaining a media type for media in a data stream of a communication session;
    causing the data stream of the communication session to be interleaved using a first interleaving depth specified based at least in part on the media type included in the communication session to generate an interleaved data stream;
    transmitting a signal that includes the interleaved data stream for receipt by an endpoint device involved in the communication session;
    receiving feedback from the endpoint device that specifies a distribution of errors in the data stream received at the endpoint device;
    comparing the distribution of errors in the data stream with a threshold error distribution value to determine a relative signal quality of the signal based at least in part on whether the distribution of errors in the data stream exceeds the threshold error distribution value;
    adjusting the first interleaving depth to form a second interleaving depth based on the relative signal quality;
    determining that the second interleaving depth does not exceed a maximum interleaving depth defined for the media type included in the communication session; and
    causing transmission of the data stream interleaved using the second interleaving depth for receipt by the endpoint device as part of the communication session.

13. A method as described in claim 12, wherein said ascertaining comprises identifying a modality flag that specifies the media type.

14. A method as described in claim 12, further comprising determining the first interleaving depth by matching the media type to a set of default interleaving depths specified for different media types.

15. A method as described in claim 12, wherein the relative signal quality is determined to be a poor signal quality and wherein said adjusting comprises increasing the first interleaving depth.

16. A method as described in claim 12, wherein said adjusting the first interleaving depth is performed while the communication is in progress.

17. A computer-implemented method comprising:
encoding a data stream using a first interleaving depth to be transmitted via a signal for receipt by an endpoint device involved in a communication session, the first interleaving depth based at least in part on a media type included in the communication session;
receiving feedback from the endpoint device that specifies a distribution of errors in the data stream received at the endpoint device;
comparing the distribution of errors specified in the data stream with a threshold error distribution value to determine a relative signal quality of the signal based at least in part on whether the distribution of errors in the data stream exceeds the threshold error distribution value;
adjusting the first interleaving depth to form a second interleaving depth based on the relative signal quality;
determining that the second interleaving depth does not exceed a maximum interleaving depth defined for a media type included in the communication session; and
encoding the data stream using the second interleaving depth;
transmitting the data stream encoded using the second interleaving depth for receipt by the endpoint device and as part of the communication session via the signal.

18. A method as described in claim 17, wherein the first interleaving depth is determined from a set of pre-specified interleaving depths that specify different interleaving depths for different media types.

19. A method as described in claim 17, wherein said adjusting the first interleaving depth is performed while the communication is in progress.

20. A method as described in claim 17, further comprising:
receiving further feedback that indicates a poor signal quality for the data stream encoded using the second interleaving depth;
ascertaining that the second interleaving depth is the maximum interleaving depth for the media type included in the communication session; and
adjusting error correction coding applied to the data stream to attempt to increase a signal quality of the data stream.

* * * * *